(12) United States Patent
Naor et al.

(10) Patent No.: US 6,226,743 B1
(45) Date of Patent: May 1, 2001

(54) METHOD FOR AUTHENTICATION ITEM

(75) Inventors: Moni Naor, Tel-Aviv; Yaacov Nissim, Ramat Gan, both of (IL)

(73) Assignee: Yeda Research and Development Co., Ltd., Rehovot (IL)

( * ) Notice: Subject to any disclaimer, the term of this patent is extended or adjusted under 35 U.S.C. 154(b) by 0 days.

(21) Appl. No.: 09/010,571

(22) Filed: Jan. 22, 1998

(51) Int. Cl.[7] .................................................. H04L 9/00
(52) U.S. Cl. .......................................... 713/177; 713/157
(58) Field of Search .............................. 380/25; 713/157, 713/177

(56) References Cited

U.S. PATENT DOCUMENTS

| | | | |
|---|---|---|---|
| 4,309,569 | * | 1/1982 | Merkle ............................... 178/22.08 |
| 5,231,666 | * | 7/1993 | Matyas ..................................... 380/25 |
| 5,903,651 | * | 5/1999 | Kocher .................................... 380/25 |

OTHER PUBLICATIONS

Kaufman, A., et al., "Network Security: Private Communication in a Public World," Section 7.7.3., Prentice Hall (1995).

Aho, A.V., et al., "Data Structure and Algorithms," pp. 169–180, Addison–Wesley (1983).

Seidel, R., et al., "Randomized Search Trees," University of California Berk$_e$ley, Computer Science Division, Nov. 27,1994.

Bellare, M., et al., "Collision–Resistant Hashing: Towards Making UOWHFs Practical," University of California at San Diego and Davis, Department of Computer Science, Jul. 17, 1997.

Even, S., et al., "On–Line/Off–Line Digital Signatures," *Journal of Cryptology* 9:35–67 (1996).

Goldreich, O., et al, "Collision–Free Hashing from Lattice Problems," MIT–Laboratory for Computer Science, Oct. 3, 1996.

Herzberg, A. et al., "Mini–Pay: Charging per Click on the Web," IBM Research Lab, Tel Aviv Annex.

Kocher, P., "A Quick Inroduction to Certificate Revocation Trees (CRTs)".

Merkle, R.C., "A Certified Digital Signautre," Xerox PARC, Palo Alto, CA.

Micali, S., "Efficient Certificate Revocation," MIT–Laboratory for Computer Science, Mar. 22, 1996.

Naor, M., et al., "Certificate Revocation and Certificate Update," Weizman Institute of Science, Dept. of Applied Mathematics and Computer Science.

* cited by examiner

*Primary Examiner*—Tod Swann
*Assistant Examiner*—Steve Kabakoff
(74) *Attorney, Agent, or Firm*—Browdy and Neimark

(57) ABSTRACT

A memory containing an authenticated search tree that serves for authenticating membership or non membership of items in a set. The authenticated search tree including a search tree having nodes and leaves and being associated with a search scheme. The nodes including dynamic search values and the leaves including items of the set. The nodes are associated, each, with a cryptographic hash function value that is produced by applying a cryptographic hash function to the cryptographic hash values of the children nodes and to the dynamic search value of the node. The root node of the authenticated search tree is authenticated by a digital signature.

11 Claims, 3 Drawing Sheets

METHOD FOR AUTHENTICATION ITEM

FIELD OF THE INVENTION

The present invention is in the general field of digital signature for authentication purposes.

BACKGROUND OF THE INVENTION

The wide use of public key cryptography requires the ability to verify the authenticity of public keys. This is achieved through the use of certificates (that serve as a mean for transferring trust) in a Public Key Infrastructure (PKI). A certificate is a message signed by a publicly trusted authority (the certification authority, whose public key authenticity may be provided by other means) which includes a public key and additional data, such as expiration date, serial number and information regarding the key and the subject entity.

When a certificate is issued, its validity is limited by an expiration date. However, there are circumstances (such as when a private key is revealed, or when a key holder changes affiliation or position) where a certificate must be revoked prior to its expiration date. Thus, the existence of a certificate is a necessary but not sufficient evidence for its validity, and a mechanism for determining whether a certificate was revoked is needed.

A typical application is a credit card system where the credit company may revoke a credit card, temporarily or permanently, prior to its expiration, e.g. when a card is reported stolen or according to its user's bank account balance.

PRIOR ART DISCUSSION

Certificate Revocation List (CRL)

A CRL is a signed list issued by the CA identifying all revoked certificates by their serial numbers. The list is concatenated with a time stamp (as an indication of its freshness) and signed by the CA that originally issued the certificates. The CRLs are sent to the directory on a periodic basis, even if there are no changes, to prevent the malicious replay of old CRLs instead of new CRLs.

As an answer to a query, the directory supplies the most updated CRL (the complete CRL is sent to the merchant).

The main advantage of the scheme is its simplicity.

The main disadvantage of the scheme is its high directory-to-user communication costs (since CRLs may get very long). Another disadvantage is that a user may not hold a succinct proof for the validity of his certificate.

A reasonable validity expiration period should be chosen for certificates. If the expiration period is short, resources are wasted reissuing certificates. If the expiration period is long, the CRL may get long, causing high communication cost and difficulties in CRL management. Kaufman et al. [15, Section 7.7.3] suggested reissuing all certificates whenever the CRL grows beyond some limit. In their proposal, certificates are marked by a serial number instead of an expiration date. (Serial numbers are incremented for each issued certificate. Serial numbers are not reused even when all certificates are reissued). The CRL contains a field indicating the first valid certificate. When all certificates are reissued, the CRL first valid certificate field is updated to contain the serial number of the first reissued certificate.

Certificate Revocation System

Micali [18) suggested the Certificate Revocation system (CRS) in order to improve the CRL communication costs. The underlying idea is to sign a message for every certificate stating whether it was revoked or not, and to use an off-line/on-line signature scheme [11] to reduce the cost of periodically updating these signatures.

To create a certificate, the CA associates with each certificate two numbers ($Y_{365}$ and N) that are signed along with the 'traditional' certificate data. For each certificate, the CA chooses (pseudo) randomly two numbers $N_0$ and $Y_0$ and computes (using a one-way function $f$) $Y_{365}=f^{365}(Y_0)$ and $N=f(N_0)$. (Actually, a stronger assumption on $f$ is required, e.g. that $f$ is one-way on its iterates, i.e. that given $y=f^i(x)$ it is feasible to find x' such that y=f(x'). This is automatically guaranteed if $f$ is a one-way permutation).

The directory is updated daily by the CA sending it a number C for each certificate as follows:

1. For a non-revoked certificate, the CA reveals one application of $f$, i.e. $C=Y_{365-i}=f^{365-i}(Y_0)$, where i is a daily incremented counter, i=0 on the date of issue.
2. For a revoked certificate, $C=N_0$.

Thus the most updated value for C serves as a short proof (that certificate x was or was not revoked) that the directly may present in reply to a user query x.

The advantage of CRS over CRL is in its query communication costs. Based on Federal PKI (Public Key Infrastructure) estimates, Micali [18] showed that although the daily update of the CRS is more expensive than a CRL update, the cost is CRS querying is much lower. He estimated the resulting in 900 fold improvement in total communication costs over CRLs.

Another advantage of CRS is that each user may hold a succinct transferable proof of the validity of his certificate. Directory accesses are saved when users hold such proofs and presents them along with their certificates.

The main disadvantage of this system is the increase in the CA-to-directory communication (it is of the same magnitude as directory-to-users communication, where the existence of a directory is supposed to decrease the CA's communication). Moreover, since the CA's communication costs are proportional to the directory update rate, CA-to-directory communication costs limit the directory update rate.

The complexity of verifying that a certificate was not revoked is also proportional to the update rate. For example, for an update once an hour, a user may have to apply the function, $f$, 365×24=8760 times in order to verify that a certificate was not revoked, making it the dominant factor in verification.

Certificate Revocation Trees

Kocher [16] suggested the use of Certificate Revocation Trees (CRT) referred to also as authentication tree, in order to enable the verifier of a certificate to get a short proof that the certificate was not revoked. A CRT is a hash tree with leaves corresponding to a set of statements about certificate serial number X issued by a CA, $CA_X$. The set of statements is produced from the set of revoked certificates of every CA. It provides the information whether a certificate X is revoked or not (or whether its status is unknown to the CRT issuer). There are two types of statements: specifying ranges of unknown CAs, and, specifying certificates range of which only the lower certificate is revoked. For instance, if $CA_1$ revoked two certificates X1<X2, than one of the statements is:

if $CA_x=CA_1$ and $X_1 \leq X<X_3$ then X is revoked if X=v

To producer the CRT, the CRT issuer builds a binary hash tree [17] with leaves corresponding to the above statements A proof for a certificate status is a path in the hash tree, from the root to the appropriate leaf (statement) specifying for each node on the path the values of its children.

The main advantage of CRT over CRL are that the entire CRL is not needed for verifying a specific certificate and that a user may hold a succinct proof of the validity of his certificate.

The main disadvantage of CRT is in the computational work needed to update the CRT. Any change in the set of revoked certificates may result in re-computation of the entire CRT.

LIST OF CITED PRIOR ART

U.S. Pat. No. 4,309,569 (hereinafter the Merkle patent)

[1] A. V. Aho, J. E. Hopcroft, J. D. Ullman. "Data Structures and Algorithms". Addision-Wesley, 1983.

[2] R. G. Seidel., C. R. Aragon "Randomized Search Trees". Proc. 30th Annual IEEE Symp. on Foundations of Computer Science, pp. 540–545, 1989.

[6] M. Bellare, P. Rogaway. "Collision-Resistant Hashing: Towards Making UOWHFs Practical". Advances in Cryptology—CRYPTO '97, Lecture Notes in Computer Science, Springer-Verlag, 1997.

[11] S. Even, O. Goldreich, S. Micali. "On-Line/Off-Line Digital Signatures". Journal of Cryptology, Springer-Verlag, Vol. 9 pp. 35–67, 1996.

[12] O. Goldreich, S. Goldwasser, and S. Halevi,. "Collision-Free Hashing from Lattice Problems". ECCC, TR96-042, 1996.

http://www.eccc.unitrier.de/eccc/

[13] A. Herzberg, H. Yochai. "Mini-Pay: Charging per Click on the Web". Proc. 6th International World Wide Web Conference, 1997.

http://www6.nttlabs.com/

[15] C. Kaufman, R. Perlman, M. Speciner. "Network Security. Private Communication in a Public World". Prentice Hall series in networking and distributing systems, 1995.

[16] P. Koeher. "A Quick Introduction to Certificate Revocation Trees (CRTs)".

http://www.valicert.com/company/crt.html

[17] R. C. Merkle. "A Certified Digital Signature". Proc. Crypto '89, Lecture Notes in Computer Science 435, pp. 234–246, Springer-Verlag, 1989.

[18] S. Micali. "Efficient Certificate Revocation". Technical Memo MIT/LCS/TM542b, 1996.

GLOSSARY

There follows glossary of terms some of which conventional and others have been coined:

Certification Authority (CA)—A trusted party, already having a certified public key, responsible for establishing and vouching for the authenticity of public keys and/or other information such as credid card numbers.

A CA preferably, but not necessarily, does not provide on-line certificate information services to users. Instead, it updates a directory on a periodic basis). As will be shown below in some embodiments directories are not used.

A CA issues certificates of users by a message containing the certificate serial number relevant data and an expiration date. The certificate is sent to a directory and/or given to the user. The CA may revoke a certificate prior to its expiration date. Certificate is by no means bound to the latter definition and may encompass data pertain to e.g. one or more (such as range of) public key(s), credit card number(s) and others; presented either in explicit form or after having been subject to a function such as encoding or encryption. (the term item and certificate are used in the specification interchangeably)

Directory—: One or more non-trusted parties that get updated certificate revocation information from the CA and serve as a certificate database accessible by the users.

User—A non-trusted party the receives its certificate from the CA and issues queries for certificate information. User should be construed as encompassing among others:

(i) a merchant who queries the validity of other user's certificates, (ii) a user who gets proof of the validity of his/her certificate for using it vis-a-vis other users.

Search tree—A well known data structure that is associated with search scheme which enables to construct a search path in the tree, from the root to a sought item (associated with a leaf). The search leaf exploits search values that reside in the tree nodes and possibly also in the links. Search tree is inherently designed to efficiently handle update transactions (i.e. delete and/or insert items to the tree). Typical, yet not exclusive, examples of search trees being: 2–3tree, Btree, Btree+, TriS, treaps and others.

Update Transactions—Insert new item to a tree; delete existing item in a tree.

Authentication Tree—a rooted tree where each internal node authenticates the values of its children by means of a cryptographic hash function and the root is authenticated by means of a digital signature. Typical, yet not exclusive, example is illustrated in the Merkle patent.

Cryptographic hash function—includes:

(i) collision intractable function h() such that it is computationally essentially infeasible to find $y \neq x$ satisfying $h(x)=h(y)$. Typical, yet not exclusive example is illustrated in the Merkle patent; or (ii) universal one way hash function h() such that there exists a family of functions h() such that for every x and random h() from the family, it is computational essentially infeasible to find $y \neq x$ satisfying $h(x)=h(y)$. (for detailed discussion in (I) and (II), see [6]).

SUMMARY OF THE INVENTION

There is, accordingly, a need in the art for eliminating or substantially reducing the drawbacks associated with hitherto known techniques by providing a novel technique for authenticating items.

The present invention incorporates the utilization of conventional authentication trees as well as conventional search trees such as 2–3tree or Btree. The utilization of search trees enables to authenticate an item (or items) whilst obviating the need to transmit a large amount of data to this end. The utilization of the authentication tree, according to the prior art, enables to transmit a series of revoked, (or otherwise) valid items.

The major drawback of using an authentication tree, e.g. of the kind disclosed in the Merkle patent, arises when the latter is subject to modification transactions. The latter bring about new arrangement of items in the leaves and, consequently, (as will be exemplified below), necessitates the modification of the values of multitude nodes (hereinafter modified nodes) in the tree.

Not only is an extensive computation required in order to update the values of the modified nodes, by also by utilizing an authentication high communication overhead is imposed when the multitude values of said modified modes are transmitted over the communication network, e.g. from the CA to the directory. Considering that such modification may occur quite frequently, the specified overhead renders the use of prior art authentication trees commercially infeasbile.

According to the invention, a conventional authentication tree is "superimposed" on conventional search tree (bringing about authentication search tee) benefiting this both from the inherent advantages of the authentication tree insofar as authenticating items is concerned and from the limited changes that are imposed on the tree nodes due to the search tree structure.

Accordingly, the present invention provides for a memory containing an authenticated search tree that serves for authenticating membership or non membership of items in a set; the authenticated search tree, comprising:

a search tree having nodes and leaves and having associated therewith a search scheme; the nodes including dynamic search values and the leaves including items of said set; the nodes are associated, each, with a cryptographic hash function value that is produced by applying a cryptographic hash function to at least: (I) the cryptographic hash values of the children nodes and (II) the dynamic search value of said node;

at least the root node of said authenticate search tee is authenticated by a digital signature.

Still further the invention provides for a method for authenticating membership or non membership of items in a set; comprising:

(i) providing an authenticated search tree of the kind specified;

(ii) authenticating at least one item of said set by computing the authentication past as induced by said at least one item and the root.

Still further the invention provides for a method for updating at least one item of a set in an authenticated search tree, comprising:

(i) providing a search authenticated tree of the kind specified;

(ii) updating said search tree so as to obtain updated nodes;

(iii) computing an authentication path as induced by said updated nodes; and (iv) authenticating at least said root modified node by a digital signature.

It should be noted that the specified order does not necessarily imply that in iterative procedure all the steps are performed in each iteration. Thus, for example, the steps (ii) and (iii) may be performed in each iteration and step (iv) may be applied one at the last iteration. This, likewise, applies to the other aspects of method and system as described herein.

The invention further provides a system for authenticating/updating mutatis mutandis.

BRIEF DESCRIPTION OF THE DRAWINGS

The invention will now be described, by way of example only with reference to the accompanying drawings, in which.

DESCRIPTION OF SPECIFIC EMBODIMENTS

Figure 1:
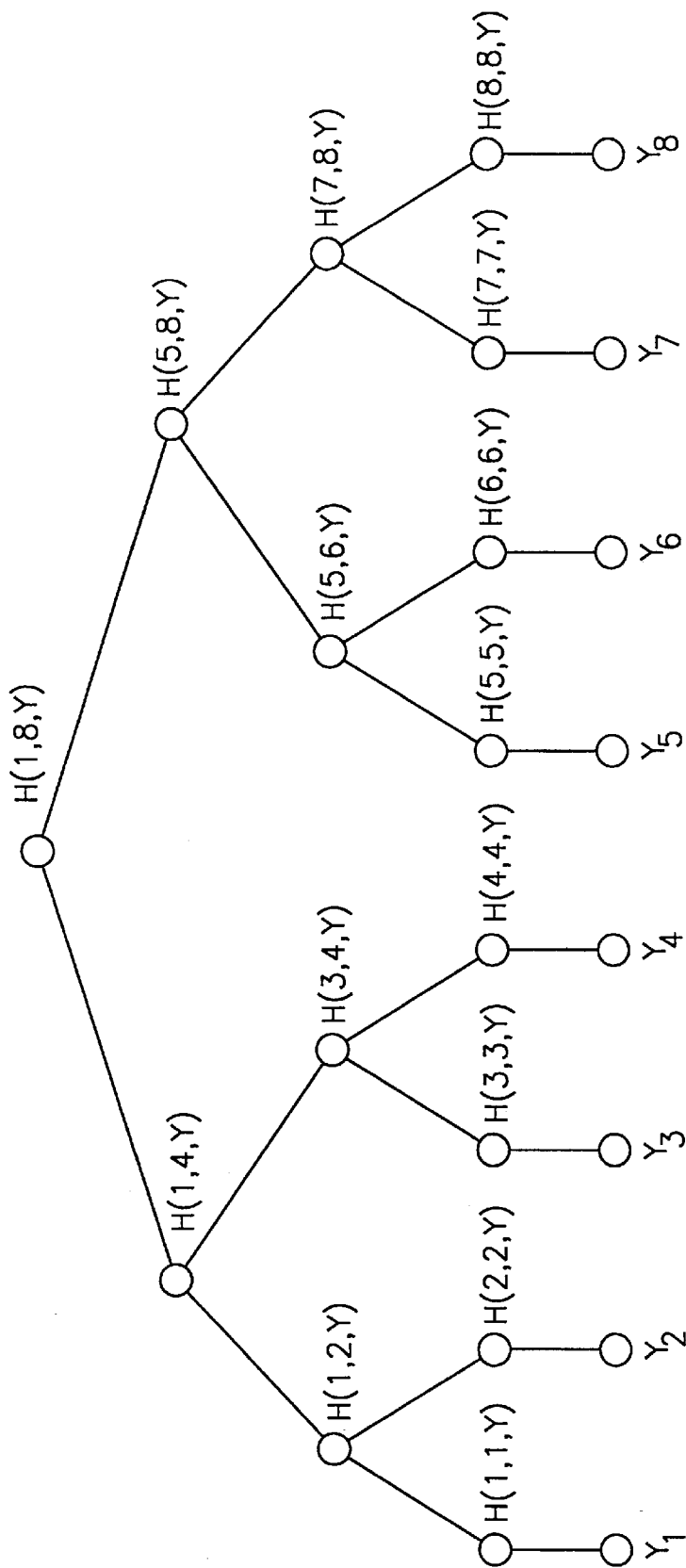
FIG. 1 illustrates an authentication tree according to the prior art.

Attention is first directed to FIG. 1 illustrating an authentication tree according to the prior art e.g as disclosed in the specified Merkle patent, the contents of which are incorporated herein by reference.

Consider, for example, that certificates $Y_1$ to $Y_8$ stand for a certificate list (CL) of all valid credit cards. Now, a user wants to use his credit card $Y_5$ in a commercial transaction vis-a-vis a merchant. The merchant addresses a directory that holds the authentication tree (i.e. authentication tree in respect of valid credit cards $Y_1$ to $Y_8$) of the kind disclosed in FIG. 1. It is recalled that the directory is an un-trusted party and therefore the merchant wants to verify that $Y_5$ indeed appears in the tree.

The collision intractable function h() serves for authenticating item(s) (credit cards) $Y_1$ to $Y_8$ sorted according to credit card number, e.g. in ascending order. Thus, in order to authenticate $Y_5$, it is sufficient for the directory to transmit to the merchant tree leaf and node values $Y_5$, H(6,6,Y), H7,8,Y) and H1,4,Y), assuming that the root value H(1,8,Y) was previously authenticated, e.g. using a digital signature. Of course, additional tree values may be transmitted but as will be appreciated from the description below transmitting additional tree values is absolutely redundant.

Thus, in order to authenticate $Y_5$, the merchant (knowing a priori H() calculates the authentication path, namely, H(5,5,Y) (on the basis of $Y_5$) and on the basis of H(5,5,Y) and the so received H(6,6,Y), the merchant calculates H(5, 6,Y). The latter, along with so received H(7,8,Y) give rise to H(5,8,Y). The latter along with the so received H(1,4,Y) give rise to H(1,8,Y) which is subject to PKI technique (e.g. applying the public key n), and the result is compared to the previously authenticated H(1,8,Y) value and in the case of matching, it is assured that the item $Y_5$ belongs to the list of valid credit cards.

The advantage of the authentication tree is, of course, that only few tree node values were transmitted to the user which could nevertheless authenticate the item $Y_5$ of interests. As will be explained in below, the specified description of authenticating items in respect of prior art authentication tree applies to the search authenticated tree of the invention.

The major drawback of the authentication tree of FIG. 1 arises when the latter is subject to modify transaction, e.g. when new credit card is added to the list at the CA. Suppose that new item $Y_4$ such that $Y_4 < Y_{4'} < Y_5$ is added. The resulting authentication tree (not shown) will necessitate extensive update of most of the nodes in the tree and undue transmission overhead of the updated information, which is obviously undesired, particularly when bearing in mind that the rate of updating the CA with new items is as a rule quite high.

The advantages and disadvantages equally apply when considering a certificate revocation list (CRL) which holds the invalidated or revoked items (e.g. invalid credit cards).

Figure 2A:
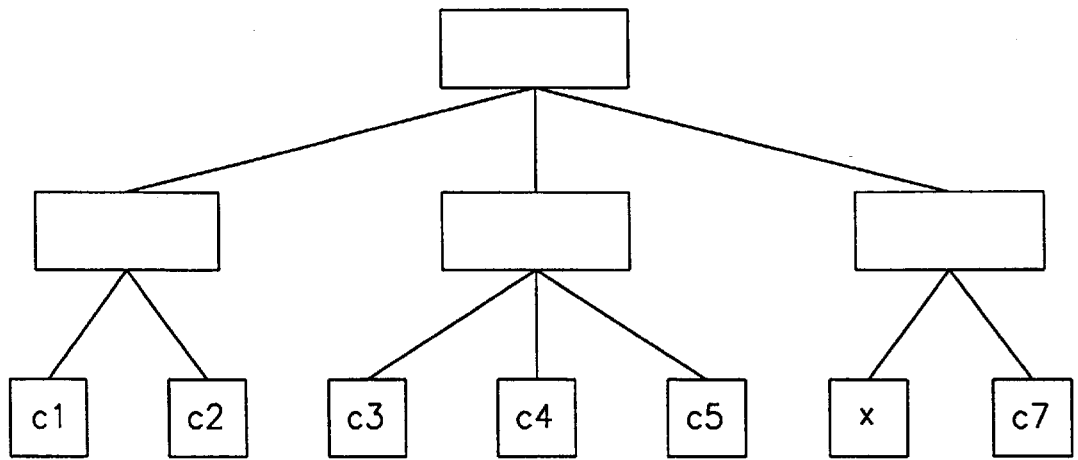
FIGS. 2A–B illustrate a search authenticated tree according to one embodiment of the invention.
Figure 2B:
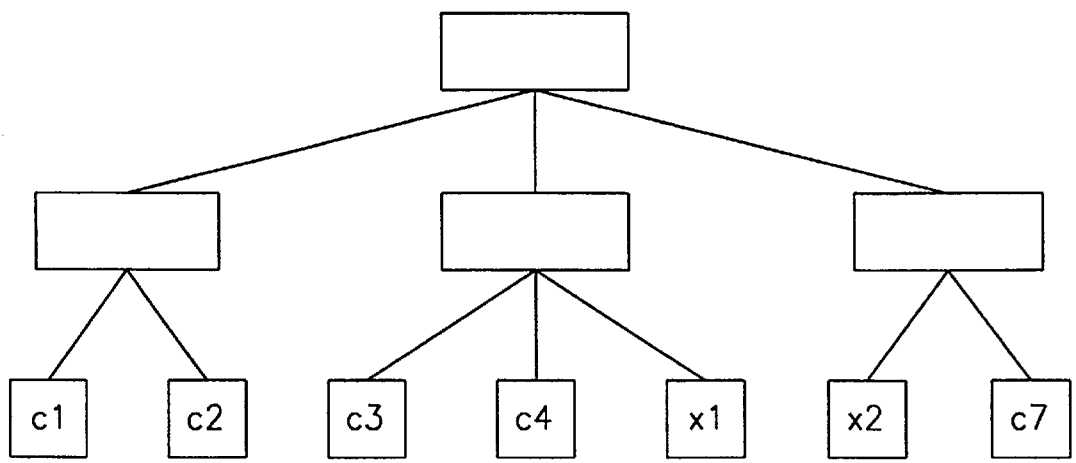

Considering now an exemplary search authenticated tree according to one embodiment of the invention utilizing e.g. a 2–3 search tree with a CRL (e.g. a list of revoked credit cards held at the leaves, See FIGS. 2A–B).

In this connection it should be noted that the invention is, by no means, bound to the actual realization of the search tree and any known technique that is utilized to this end is appplicable, all as required and appropriate depending upon the particular application. Thus, by way of non-limiting example, any manner of building the items in the leaves is applicable, e.g. as records, link list, tree, of blocks (in the case of long item) etc. This statement is likewise valid to the authentication tree.

Thus, by this particular embodiment, a 2–3 tree is maintained with leaves corresponding to the revoked certificates' serial numbers (c1–c7) in increasing order. (In a 2–3 tree every interior node has two or three children and the paths from root to leaves have the same length). Testing membership and modifying, i.e. inserting, deleting or updating a single element are done in logarithmetic time, where the modification affects only the nodes on the modification path. For a detailed presentation of 2–3 trees see [1, pp. 169–180].) The property of 2–3 trees is that test and modification involve only changes to nodes on a search path, i.e. every change is local and the number of affected paths is small.

The tree may be created either by inserting the serial numbers of the revoked certificates one by one into an initially empty 2–3 tree, or, by sorting the list of serial numbers and building a degree 2 tree with leaves correspond to the serial numbers in the sorted list (because the communication complexity is minimal when the tree is of degree 2).

Every tree node is assigned a value according to the following procedure:

Each leaf stores a revoked certificate serial number as its value.

The value of an internal node is computed by applying the cryptographic hash function H() to the values of its children and to at least the dynamic search values of the internal node (which encompasses also link, whenever applicable). Whilst it is not obligatory, the cryptographic one way hash function H() may also be applied to information, other than the dynamic search values that are associated with the node, e.g. information relevant for balancing the tree etc.

Unlike the collision intractable function, applying the universal one way hash function to the internal nodes in the manner specified, necessitates utilization of unique function for each node. For the latter case, it is required to authenticate in addition to the above referred to values of the children and the dynamic search values of the internal node, also the unique value of the function that is associated to the internal node.

There follows now a description that pertains to modifying the search authenticated tree according to one embodiment of the invention.

Thus, in order to delete an item, a conventional 2–3 delete item step is executed, namely:

1. Delete each expired certificate serial number from the 2–3 tree, updating the values of the nodes on the deletion path.

Likewise, in order to insert an item, a conventional 21 3 insert item step is executed, namely:

2. Insert each newly revoked certificate serial number into the tree, updating the values of the nodes on the insertion path.

During tree update, some new nodes may be created or some nodes may be deleted due to the balancing of the 2–3 tree. These nodes occur only on the search path for an inserted/deleted node (hereinafter: modified node).

The certification authority authenticates the tree by authenticating the root and to this end, only the search path that is induced by the modified nodes should be computed.

For a simpler implementation of the search authenticated tree, other trees, e.g. random treaps [2], may be used instead of 2–3 trees. Treaps are binary trees whose nodes area associated with (key, priority) pairs. The tree is a binary search tree with respect to node keys (i.e. for every node the keys in its left (resp. right) subtrees are small (resp. greater) than its key), and a heap with respect to node priorities (i.e. for every node its priority s higher than its descendents' priorities). Every finite set of (key, priority) pairs has a unique representation as a treap. In random treaps, priorities are drawn at random from a large enough ordered set (thus, they are assumed to be distinct).

Seidel and Aragon [2] present simple algorithms for membership queries, insert and delete operations with expected time complexity logarithmic in the size of the set S stored in the treap. Random treaps may be easily converted into authenticated search data structures similarly to 2–3 trees. The communication costs of these schemes is similar since the expected depth of a random treap is similar to its 2–3 tree counterpart.

The main advantage of random treaps is that their implementation is much more simple than the implementation of 2–3 trees.

A drawback of using random treaps is that their performance is not guaranteed in worst case, e.g. some users may (with low probability) get long authentication paths.

Another drawback is that a stronger assumption is needed with respect to the directory. The analysis of random treaps is based on the fact that the adversary does not know the exact representation of a treap. A dishonest directory with ability to change the status of certificates may increase the computational work and communication costs of the system.

Figure 3:
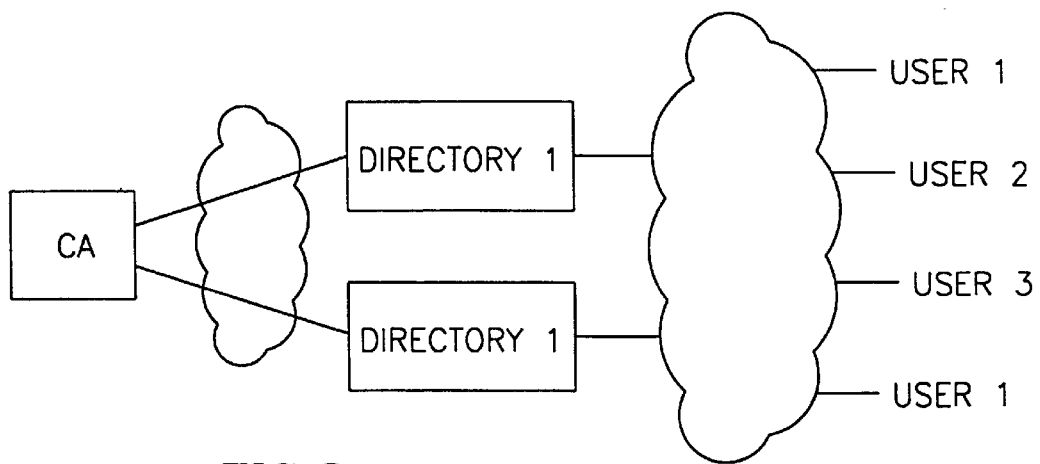
FIG. 3 illustrates a system configuration according to one embodiment of the invention.

The operation of a system of the invention will be exemplified in one non-limiting sequence of operation which refers to an embodiment of the invention as depicted in FIG. 3.

Generally speaking there is provided a method in a CA, directory, user scheme, including the steps of:

(a) the user providing to a directory a list of at least one item for authenticating membership or non membership of said at least one item in a set;

(b) the directory computing and transmitting to a user the authentication path(s) as induced by said at least one item; the directory further transmitting said authenticated root; and (c) the user verifying said items.

Still further there is provided a method in a CA directory user scheme comprising the steps of:

(i) updating said search tree so as to obtain updated nodes;

(ii) computing an authentication path as induced by said updated nodes; and (iii) authenticating at least said root modified node by a digital signature;

(iv) transmitting modified parameters to said directory; the directory executing:

(i) applying said modification parameters, so as to obtain authenticated directory root value;

(ii) verifying that the authenticated CA root value matched the authenticated directory value.

A specification description of the general aspect above will now be described.

CA Operations

Creating certificates: The CA produces a certificate by authenticating a message containing certificate data (e.g. user name and public key), certificate serial number and expiration date.

Initialization: The CA creates the 2–3 tree, as above, for the set of initially revoked certificates. It computes and stores the values of all the tree nodes and sends to the directory the (sorted) list of revoked certificate serial numbers along with a signed message containing the tree root value, the tree height and a time stamp.

Updating: The CA updates the tree by inserting/deleting certificates from it. After each insertion/deletion, all induced nodes are updated and the authenticated path is calculated accordingly. To update the directory, the CA sends a modification parameters. The latter may be for example the list of induced nodes, the list of the transactions. In fact modification parameter encompass any kind of information that enables the directory to update the tree at the directory end. Of course, authenticating the root encompasses of course the new root value but may likewise include other authenticated information e.g. tree height and time stamp.

Directory operations

Initialization: Upon receiving the initial revoked certificates list, the directory computes by itself the whole 2–3 tree, checks the root value, tree height and time stamp, and verified the CA's signature on these values.

Response to CA's update: The directory updates the tree according to the modified parameters received from the CA. This results in recomputed path and authenticated directory root. Having done so it checks verifies the so obtained root value vis-a-vis the received authenticated root value as received from the CA in order to determine match, in which case the procedure terminates successfully. By this particular embodiment the root value, tree height and time stamp, all have to match (the time, of course, within reasonable interval).

Response to user's queries: To answer a user query, the directory supplies the user with the authenticated root value, tree height and time stamp.
1. If the queried certificate is revoked, for each node in the path from the root to the leaf corresponding to the queried certificate, the directory supplies the user its value and its children values.
2. If the queried certificate sis not revoked (not in the list), the directory supplies the user the paths to two neighboring leaves, $l_1$, $l_2$ such that the value of $l_1$ (resp. $l_2$) is smaller (resp. larger) than the queried serial number.

Note that to reduce the communication costs, the directory need not send the node values on the path from root, but only those which are required for the user to compute the entire search path. The latter was exemplified in reference to FIG. 1 where, as recalled, only Y5, H(6,6,Y), H(7,8,Y) and H(1,4,Y) were required in order to authenticate the search path of Y5.

User Operations

The user first verifies the CA's signature on the certificate and checks the certificate expiration date. Then, the user issues a query by sending the directory the certificate serial number s. Upon receiving the directory's answer to a query, the user verifies the CA's signature on the root value, tree height and time stamp.
1. If the directory claims the queried certificate is revoked, the user checks the leaf to root path supplied by the directory by applying the hash function h.
2. If the directory claims the queried certificate is not revoked, the user checks the two paths supplied by the directory and checks that they lead to two adjacent leaves in the 2–3 tree, with values $l_1$, $l_2$. The user checks that $l_1 < s < l_2$. As shown in FIG. 2B for authenticating x (i.e. claiming that x does not belong to the revocation list) the search path that authenticate the adjacent members x1 and x2 are transmitted, where x1<x<x2.

In the above scheme, the communication cost of verifying that a certificate was not revoked may be twice the communication costs of verifying that a certificate is in the list. To overcome this, the tree may be built such that every node corresponds to two consecutive serial numbers thus having to send only one path in either case. Since the number of bits need for holding the value of a tree node, i.e. the hash function security parameter ($l_{hash}$ in the notation below) is more than twice the bits needed for holding a certificate serial number, this does not influence the tree size. In this connection it is recalled that certificate or item embrace, amongst the other, range of values.

Figure 4:
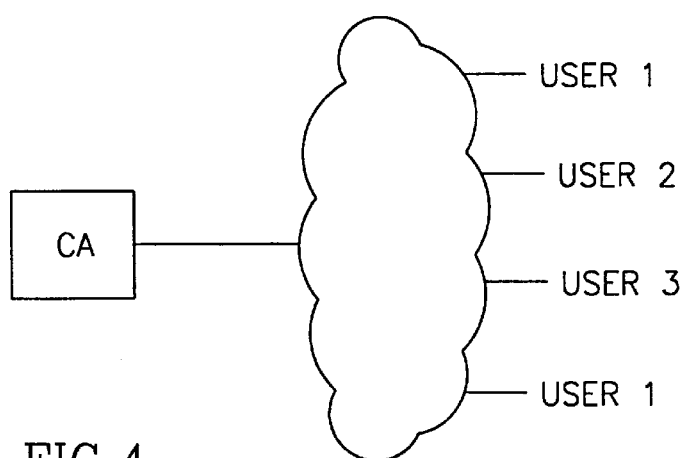
FIG. 4 illustrates a system configuration according to another embodiment of the invention.

Attention is now drawn to FIG. 4 illustrating a system configuration according to another embodiment of the invention. Thus, some protocols avoid the need for a revocation system by using short-term certificates. (e.g. micropayments protocols when a certificate owner may cause a limited damage [13]). These certificates are issued daily and expire at the end of the day of issue. Actually, even shorter periods are desired and the main limit is due to the increase in the certification authority computation (certificates for all users have to be computed daily) and communication (certificates should be sent to their owners) short-term certificates cause.

An on-line/off-line digital signature scheme (like CRS) will reduce the computation the CA has to perform, but, it will not reduce significantly the communication costs, since the CA has to send different messages to different users, making the CA a communication bottleneck. This calls for a solution where the CA performs a simple computation (say, concerning only new users and users whose certificates are not renewed) and sends a common update message to all users. Using this message, exactly all users with non-revoked certificates should be able to prove the validity of their certificates. To meet the the latter embodiment, a simple modification to the certificate revocation scheme is proposed to yield an efficient certificate update scheme in which the CA send the same update message to all users. In this solution there is no assumption of the existence of a directory (See FIG. 4) with information about all certificates, but of local directories that may hold the latest messages that are sent by the directory.

As before, the scheme is based on a tree of revoked certificates (or, otherwise, valid certificates) created by the certification authority presented above. Since there is no way to extract certificates from a directory, every user gets an initial certificate that may be updated using the CA's messages. Specifically, the CA augments every issued certificate with the path proving its validity, this is the only part of the certificate that is update periodically.

Figure 5A:
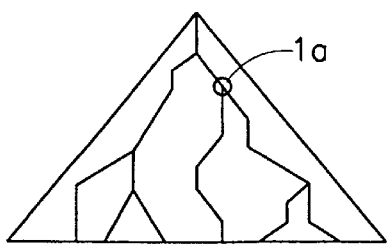
FIGS. 5A–B illustrate a manner in which a search authenticated tree is updated according to the embodiment of FIG. 4.
Figure 5B:
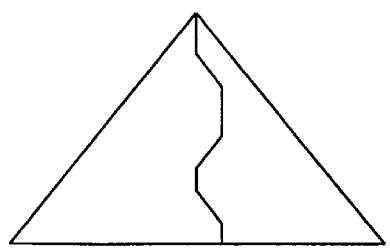

To update all certificates simultaneously, the CA updates its copy of the tree, and publishes the tree paths that were changed since the previous update (constituting one, non-limiting form of induced sub-tree). (see FIG. 5A). Every user holding a non-revoked certificate intersects its self path with the induced tree preferably by locating the lowest node, v, on a path that coincides with the self path, and updates his path by copying the new node values from v up to the root). All users holding a revoked certificate can not update their path, unless they crack the one way characteristics of the function hl. As shown in FIG. 5B the user bring into coincidence the self path with the induced sub tree and seeks for the lower most discrepancy node (designated by dot 100 in FIG. 5A). What remains to be done is to update the nodes from the so detected node to the root and to authenticate the root and verify it vis-a-vis the authenticated root value transmitted from the CA. The latter procedure is obviously very cost effective in terms of the computation overhead that is posed on each user.

Since the communication is reduced, one may use this update scheme for, say, updating certificates once every hour. This may cause some users to lag in updating their certificates, and the local directories should save several latest update messages (e.g. using conventional proxy servers), and some aggregate updates (combining update message of day) enabling users that lag several days to update their certificates.

The latter specific description is defined more generally as follows, a method of the kind specified in a CA user scheme including a plurality of users comprising:

the CA executing:
 (i) updating said search tree so as to obtain updated nodes;
 (ii) computing an authentication path as induced by said updated nodes; and
 (iii) authenticating at least said root modified node by a digital signature;
 (iv) transmitting induced sub-tree to said user;

the user executing:
 (i) intersecting said induced sub-tree with user self path and obtaining user authenticated root value;
 (ii) verifying that the authenticate CA root value matched the authenticated user value.

Those versed in the art will readily appreciate that the realization of the embodiments of FIGS. 3 and 4 are not bound to any specific hardware and/or software architecture. Thus, by way of non-limiting example, the CA, directory and user may be interlinked by any available communication network, e.g. the Internet. By way of another non-limiting example of each of the specified constituents may be implemented on e.g. conventional P.C. computer, mainframe computer or network of computers, all as required and appropriate, depending upon the particular application.

Evaluation

In the following, the communication costs of CRL, CRS and one, non limiting, embodiment of a system/method of the invention are compared. Basing on the analysis, there is shown that the proposed system is more robust to changes in parameters, and allows higher update rates than the other.

Other advantages of the proposed scheme are.
The CA has to keep a smaller secret than in CRS.
Since CA-to-directory communication is low, the CA may communicate with the directory using a slow communication line secured against breaking into the CA's computer (the system security is based on the ability to protect the CA's secrets).
In the case of a 2–3 tree, there is never a need to re-compute the entire tree to update it. This allows higher update rates than CRT.
Another consequence of the low CA-to-directory communication is that a CA may update many directories, avoiding bottlenecks in the communication network.

Communication Costs

The parameters we consider are:

n—Estimated total number of certificates (n=3,000,000).

k—Estimated average number of certificates handled by a CA (k=30,000)

p—Estimated fraction of certificates that will be revoked prior to their expiration (p=0.1). (It is assumed that certificates are issued for one year, thus, the number of certificates revoked daily is $$\frac{n \cdot p \cdot l_{sn}}{365}$$

q—Estimated number of certificate status queries issued per day (q=3,000,000).

T—Number of updates per day (T=1).

$l_{sn}$—Number of bits need to hold a certificate serial number ($l_{sn}$=20).

$l_{stat}$—Number of bits needed to hold the certificate revocation status numbers $Y_{365-i}$ and $N_0$ ($l_{stat}$=100).

$l_{sig}$—Length of signature ($l_{sig}$=1000).

$l_{hash}$—Security parameter for the has function ($l_{hash}$=128).

Values for $n,k,p,q,T,l_{sn},L_{stat}$ are taken from Micali [18], $l_{sig}$ and $l_{hash}$ are specific to out scheme.

CRL Costs

The CRL daily update cost is $T.n.p.-=l_{sn}$ since each CA send the whole CRL to the directory in each update. An alternative update procedure where the CA sends to the directory only a difference list (which serial numbers to add/remove from the previous CRL) costs:

$$\frac{n \cdot p \cdot l_{sn}}{365}$$

The CRL daily query costs is $q.p.k.l_{sn}$ since for every query the directory sends the whole CRL to the querying user.

CRL Cost

The CRS daily update cost is $T.n.(l_{sn}+l_{stat})$ since for every certificate the CA sends $l_{stat}$ bits of certificate revocation status.

The CRS daily query cost is $l_{stat}q$.

The Proposed Scheme

To update the directory, the CA sends the difference lists of total daily length of $$\frac{n \cdot p \cdot lsn}{365} + T \cdot l_{slg}$$

To answer a user's query, the directory sends up to 2 $\log_2$ (p.k) numbers, each $l_{hash}$ bits long, totaling $2.q.l_{hash}.\log_2$ (p.k) bits.

The following table shows the estimated daily communications costs (in bits) according to the three schemes.

|  | CRL Costs | CRS Costs | Proposed Scheme |
| --- | --- | --- | --- |
| Daily update (CA-directory) | 6–10$^6$ | 3.6–10$^8$ | 1.7–10$^4$ |
| Daily queries (Directory-users) | 1.8–10$^{11}$ | 3–10$^8$ | 7–10$^9$ |

As shown in the table, the proposed scheme costs are lower than CRL costs both in CA-to-directory and in directory-to-users communication. The CA-to-directory costs are much lower than the corresponding CRS costs but, the directory-to-user (and thus the over all) communication costs are increased. Note that in practice, due to communication overheads, the difference between CRS and the proposed method in Directory-to-users communication may be insignificant.

The proposed scheme is more robust to changes in parameters than CRL and CRS. Since these are bound to change in time or due to the specific needs of different implementations, it is important to have a system that is robust to such changes.

Changes will occur mainly in the total number of certificates (n) and the update rate (T). In the proposed method, changes in n are moderated by a factor of p. Changes in T are moderated by the fact that the update communication costs are not proportional to nT but to T. FIG. 8 shows how the CA-to-directory update communication costs of the three methods depend on the update rate (all other parameters are held constant). The update communication costs limit CRS to about one update a day (Another factor that limits the update rate is the amount of computation needed by a user in order to verify that a certificate was not revoked). The proposed scheme is much more robust, even allowing once per hour updates.

The present invention has been described with a certain degree of particularity, but it should be understood that various modifications and alterations may be made without departing from the scope or spirit of the invention as defined by the following claims:

What is claimed is:

1. A computer-readable memory containing an authenticated search tree that is useful in a computer system for authenticating membership or non-membership of items in a set, the authenticated search tree comprising:
   a search tree having nodes and leaves and having associated therewith a search scheme, each node including dynamic search values which collectively define the search path from the root to a leaf, and the leaves including items of said set, each node being associated with a cryptographic hash function value that is produced by applying a cryptographic hash function to at least the cryptographic hash values of the children nodes;
   at least the root node of said authenticated search tree having been authenticated by a digital signature.

2. A search authenticated tree according to claim 1, wherein said cryptographic hash function is of the universal one way hash function type, and wherein said cryptographic one way function is further applied to a universal one way function that is unique to each internal node.

3. A search authenticated tree of claim 1, wherein said search tree is Btree.

4. A search authenticated tree of claim 1, wherein said search tree is 2–3 tree.

5. A method for authenticating membership or non-membership in a set of an item, comprising:
   (i) providing an authenticated search tree having nodes and leaves and having associated therewith a search scheme, each node including dynamic search values which collectively define the search path from the root to the leaf, and the leaves including items of the set, each node being associated with a cryptographic hash function value that is produced by applying a cryptographic hash function to (I) the cryptographic hash values of children nodes and, optionally, (II) the dynamic search value of the node, and wherein at least the root node of said authenticated search tree is authenticated by a digital signature; and
   (ii) authenticating the membership or non-membership in the set of the item by computing one or more authentication paths as induced by the item and the root.

6. A method for updating at least one item of a set in an authenticated search tree, comprising:
   (i) providing an authenticated search tree having nodes and leaves and having associated therewith a search scheme, each node including dynamic search values which collectively define the search path from the root to a leaf, and the leaves including items of the set, each node being associated with a cryptographic hash function value that is produced by applying a cryptographic hash function to (I) the cryptographic hash values of children nodes and, optionally, (II) the dynamic search value of the node, and wherein at least the root node of said authenticated search tree is authenticated by a digital signature;
   (ii) updating said search tree so as to obtain updated nodes;
   (iii) computing authentication path(s) as induced by said updated nodes; and
   (iv) authenticating at least said root modified node by the digital signature.

7. A method according to claim 5, in a CA-directory-user scheme, wherein said step (ii), includes:
   (a) the user providing to a directory a list of at least one item for authenticating membership or non-membership in a set of said at least one item;
   (b) the directory computing and transmitting to a user the authentication path(s) as induced by said at least one item, the directory further transmitting said authenticated root; and
   (c) the user verifying said items.

8. A method according to claim 6, in a CA-directory-user scheme, comprising the steps of:
   the CA executing:
      (i) updating said search tree so as to obtain updated nodes;
      (ii) computing an authentication path(s) as induced by said updated nodes; and
      (iii) authenticating at least said root modified node by the digital signature; and
      (iv) transmitting modified parameters to said directory;
   the directory executing:
      (a) applying said modification parameters, so as to obtain an authenticated directory root value; and
      (b) verifying that the authenticated CA root value matches the authenticated directory root value.

9. A method according to claim 6, in a CA-user scheme including a plurality of users, comprising:
   the CA executing:
      (i) updating said search tree so as to obtain updated nodes;
      (ii) computing an authentication path(s) as induced by said updated nodes, said authentication path(s) induced by said updated nodes comprising an induced sub-tree; and
      (iii) authenticating at least said root modified node by the digital signature; and
      (iv) publishing the induced sub-tree,
   the user executing:
      (a) obtaining the published induced sub-tree;
      (b) intersecting said induced sub-tree with user self-path ad obtaining the values of the nodes in said sub-tree necessary to authenticate the user self path;

(c) computing a user authenticated root value; and
(d) verifying that the authenticated CA root value matches the authenticated user value.

10. A method of authenticating non-membership in a set of an item having a specified value, comprising:

(i) providing an authenticated search tree having nodes and leaves having associated therewith a search scheme, each node including dynamic search values which collectively define the search path from the root to a leaf, and the leaves including items of the set, each node being associated with a cryptographic hash function value that is produced by applying a cryptographic hash function to (I) the cryptographic hash values of children nodes and, optionally, (II) the dynamic search value of the node, and wherein at least the root node of said authenticated search tree is authenticated by a digital signature; and (ii) authenticating non-membership in the set by receiving authenticated path(s) authenticating the values of two adjacent leaves and determining that the value of said item is between the values of the two adjacent leaves.

11. A memory in accordance with claim 1, wherein each node of said search tree is associated with a cryptographic hash function value that is produced by applying a cryptographic hash function to (I) the cryptographic hash value of the children nodes, and (II) the dynamic search value of said node.

* * * * *